Patented May 2, 1950

2,506,089

UNITED STATES PATENT OFFICE 2,506,089

DIESEL FUEL

Milton P. Kleinholz, East Chicago, Ind., assignor to Sinclair Refining Company, New York, N. Y., a corporation of Maine No Drawing. Application August 14, 1947,
Serial No. 768,701

3 Claims. (Cl. 44—57)

This invention relates to an improved fuel for high speed compression-ignition engines of the Diesel type. The fuel is characterized in that it contains sulfurized poly-olefin as a cetane number improver.

Olefins which may be polymerized, or copolymerized, and then sulfurized to produce the additive herein, include olefins of low boiling point as ethylene, propylene, butylene, amylene, etc., and higher molecular weight olefins, such as those derived by the cracking of paraffin wax and petrolatum. The polymerization of the olefin or olefins may be effected by conventional methods. Thus, in the polymerization or copolymerization of the low molecular weight olefins, a catalyst comprising phosphoric acid on a clay carrier may be employed with good effect.

In the practice of my invention particularly good results have been obtained when the additive was prepared by the sulfurization of an olefin polymer of the following characteristics derived by the phosphoric acid copolymerization of a mixture of propylene, iso- and normal butylenes:

Gravity, API _____ 63.6
Bromide No., Francis _____ 131.2
100 cc. distillation:

Initial boiling point
        degrees Fahrenheit__ 104
 10% _____do____ 183
 20% _____do____ 202
 30% _____do____ 210
 40% _____do____ 216
 50% _____do____ 222
 60% _____do____ 229
 70% _____do____ 240
 80% _____do____ 264
 90% _____do____ 352
 E. P. _____do____ 427

Recovery _____per cent__ 95
Residue _____do____ 1.3
Loss _____do____ 3.7

In the sulfurization, I use elemental sulfur, most suitably, flowers of sulfur. The amount of sulfur employed in the reaction and the quantity of combined sulfur present in the reaction product may vary within wide limits, as may the temperature at which the reaction is carried out and its duration. I have not determined the critical limits, if there be such, but in the course of my investigations, I have prepared the additive using from 5 to 30% sulfur on the total weight of the reaction charge, reaction temperatures ranging from 275° F. to 400° F. and reaction periods of from 4 to 48 hours. In each case I found that the additive increased the cetane rating of Diesel fuels. In general, the higher the temperature, the shorter the reaction time required to produce chemical combination of the reactants; also, the greater the proportion of sulfur used, the higher the percent combined sulfur in the final product. If desired, sulfurization time can be reduced through the use of an accelerator such as piperidinium pentamethylene dithiocarbamate—1% of which is sufficient. The use of a pressure vessel is unnecessary as to those poly-olefin fractions boiling within the range of about 270° F. to about 350° F. where the temperature of the reaction is not permitted to substantially exceed 275° F.–300° F.

The exact nature of the reaction product has never been definitely determined, but it would appear from tests which I have made that the product in each case represents a complex mixture containing only very small amounts, if any, of mercaptans, sulfides, or free sulfur. Most of the preparations analyzed from about 20 to 45% combined sulfur, indicating the introduction of from 1 to 3 sulfur atoms for each double bond present in the poly-olefin molecule.

Although the additive may be added to the Diesel fuel in larger amounts, I generally do not incorporate the additive in amounts exceeding 2% on the weight of the fuel. Substantial improvement obtains upon incorporation of as little as 0.25% of the additive.

The addition agent provided by my invention is especially valuable for improving low quality base stocks and it may be used advantageously with any type of fuel whether it be paraffinic, aromatic, or naphthenic and irrespective of the method used in the refining of the fuel. It is adapted to be used with other addition agents including, for example, other cetane number improvers, pour point depressors, corrosion inhibitors, oiliness agents and viscosity improvers.

The detailed practice of my invention is illustrated by the following example which is not to be taken as in any way restrictive of the scope thereof:

3,130 grams of a poly-olefin fraction having the characteristics indicated above and 778 grams of flowers of sulfur were charged to a 5.5 liter autoclave, which was then purged five times with nitrogen. The temperature of the reactants was raised to 310° F. in 1.5 hours by means of an electrically heated element. A gauge pressure of 110 pounds per square inch was obtained. The reaction was continued with stirring for 12 hours at 310° F., following which the reaction mixture was cooled to room temperature and transferred to a 5-liter 3-neck flask. Unreacted poly-olefin was removed by topping to a final overhead temperature of 140° F. and a bottom temperature of 220° F. at 2 mm. Hg pressure. 2,067 grams of liquid residue (about 53% by weight on the total reaction charge) analyzing 37.6% sulfur and 1,636 grams of distillate were obtained. The liquid residue was stirred for 10 minutes at 250° F. with 10% of its weight of filter clay and filtered. 1,776 grams of a dark red liquid, analyzing 37.97% sulfur, was obtained as product.

0.25%, 0.50% and 1.0%, respectively, of the product obtained as above, was incorporated in a Diesel oil with the following results:

|  | Cetane number | Cetane No. Difference |
|---|---|---|
| Base Fuel | 52.9 |  |
| Base +0.25%v additive | 55.4 | +2.5 |
| Base +0.50%v additive | 57.9 | +5.0 |
| Base +1.00%v additive | 59.5 | +6.6 |

The cetane numbers were determined in accordance with the general method discussed in the June 1936 issue of the Journal of the Society of Automotive Engineers, at page 225.

The laboratory inspection on the Diesel oil used in the cetane determinations is given below:

| | |
|---|---|
| Gravity | 39.5 |
| P. M. flash_____degrees Fahrenheit | 150 |
| Vis at 100° F., S. S. U | 34 |
| Cloud point_____degrees Fahrenheit | 0 |
| Pour point_____do | −5 |
| Color | 1+ |
| Aniline point_____degrees Fahrenheit | 150.2 |
| Sulfur_____percent | 0.25 |
| Copper corrosion test | Passes |
| Carbon residue 10% residuum | 0.01 |
| Cetane number | 52.9 |
| Diesel index | 59.3 |

200 cc. distillation:

| Initial boiling point | | |
|---|---|---|
| | degrees Fahrenheit | 350 |
| 10% | do | 412 |
| 20% | do | 432 |
| 30% | do | 448 |
| 40% | do | 464 |
| 50% | do | 481 |
| 60% | do | 499 |
| 70% | do | 519 |
| 80% | do | 548 |
| 90% | do | 587 |
| E. P. | do | 660 |
| Recovery | percent | 99 |
| Residue | do | 1 |

The copolymer used in the example cited was made from a feed stock which contained approximately 9.6% propylene, 18.1% butene-1, 9.7% butene-2 and 7.9% isobutylene on a mol-percent basis.

I claim:

1. A Diesel fuel consisting essentially of a hydrocarbon Diesel oil blended with a cetane improving quantity of a polyolefin derived by polymerization of lower olefins, mixtures thereof, olefinic mixtures from cracking operations, and the like which has been sulfurized with elemental sulfur in a proportion by weight on the charge of the order of about 5 to 30% and at an elevated temperature of the order of about 275° to 400° F.

2. A Diesel fuel consisting essentially of a hydrocarbon Diesel oil blended with from 0.25 to 2% on the weight of the oil of a polyolefin gasoline derived by polymerization of refinery cracked gases which has been sulfurized with elemental sulfur in a proportion by weight on the charge of the order of about 5 to 30% and at an elevated temperature of the order of about 275° to 400° F.

3. A Diesel fuel consisting essentially of a hydrocarbon Diesel oil blended with from 0.25 to 2% on the weight of the oil of a copolymer of propylene, isobutylene and normal butylene which has been sulfurized with elemental sulfur in a proportion by weight on the charge of the order of about 5 to 30% and at an elevated temperature of the order of about 275° to 400° F.

MILTON P. KLEINHOLZ.

REFERENCES CITED

The following references are of record in the file of this patent:

UNITED STATES PATENTS

| Number | Name | Date |
|---|---|---|
| 2,246,282 | Zimmer et al. | June 17, 1941 |
| 2,380,072 | Reid | July 10, 1945 |
| 2,417,415 | Hughes | Mar. 18, 1947 |